(12) United States Patent
Uchida et al.

(10) Patent No.: US 7,501,171 B2
(45) Date of Patent: Mar. 10, 2009

(54) OPTICAL INFORMATION RECORDING MEDIUM

(75) Inventors: Mamoru Uchida, Nakamuroda Haruna-Machi (JP); Isao Okitsu, Nakamuroda Haruna-Machi (JP); Takuo Kodaira, Nakamuroda Haruna-Machi (JP); Toru Fujii, Nakamuroda Haruna-Machi (JP)

(73) Assignee: Taiyo Yuden Co., Ltd., Tokyo (JP)

( * ) Notice: Subject to any disclaimer, the term of this patent is extended or adjusted under 35 U.S.C. 154(b) by 573 days.

(21) Appl. No.: 11/159,616

(22) Filed: Jun. 23, 2005

(65) Prior Publication Data
US 2005/0287332 A1    Dec. 29, 2005

(30) Foreign Application Priority Data
Jun. 25, 2004    (JP)    ............................. 2004-187749

(51) Int. Cl.
 *B32B 3/02*    (2006.01)
(52) U.S. Cl. .................... 428/64.1; 428/64.4; 428/64.8; 430/270.14; 430/270.18
(58) Field of Classification Search ................ 428/64.4, 428/64.8; 430/270.14, 270.18, 270.2, 270.21
See application file for complete search history.

(56) References Cited

U.S. PATENT DOCUMENTS 5,009,987 A    4/1991    Mihara et al.

(Continued)

FOREIGN PATENT DOCUMENTS

DE    39 38 006 A1    5/1990

(Continued)

*Primary Examiner*—Elizabeth Mulvaney
(74) *Attorney, Agent, or Firm*—Knobbe Martens Olson & Bear

(57) ABSTRACT

An optical information recording medium has light interference layers including a recording layer on a substrate. The recording layer includes an organic dye and a photostabilizer which is, for example, the compound of formula 1

[Chemical formula 1]

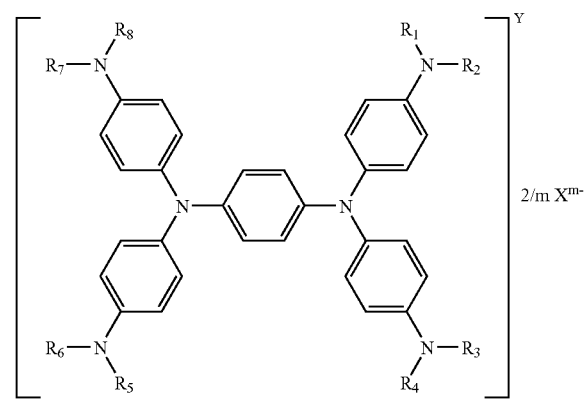

wherein at least one of $R_1$ to $R_8$ represents a substituted alkyl group having a terminal cyano group, with the others represent other substituents; Y represents a monovalent or divalent cation; and $X^{m-}$ represents a monovalent or divalent anion.

13 Claims, 6 Drawing Sheets

U.S. PATENT DOCUMENTS

| | | | | |
|---|---|---|---|---|
| 5,318,882 | A | * | 6/1994 | Ootaguro et al. ........ 430/270.19 |
| 5,776,656 | A | * | 7/1998 | Shinkai et al. ......... 430/270.19 |
| 6,063,467 | A | * | 5/2000 | Kanno ........................ 428/64.1 |
| 6,475,590 | B1 | * | 11/2002 | Kitayama et al. .......... 428/64.8 |
| 2002/0076648 | A1 | | 6/2002 | Berneth et al. |

FOREIGN PATENT DOCUMENTS

| | | |
|---|---|---|
| DE | 102 34 288 A1 | 2/2004 |
| EP | 0 403 797 A2 | 12/1990 |
| EP | 0 837 459 A1 | 4/1998 |
| EP | 0 996 123 A2 | 4/2000 |
| EP | 1 103 547 A1 | 5/2001 |
| JP | 03-164292 A | 7/1991 |
| JP | 03164292 | 7/1991 |
| JP | 05-148193 | 6/1993 |
| JP | 05-178808 | 7/1993 |
| JP | 10-134413 | 5/1998 |
| JP | 10-337958 | 12/1998 |
| JP | 11-277904 | 10/1999 |
| JP | 2000-80071 A | 3/2000 |
| JP | 2000-118145 | 4/2000 |
| JP | 2000-141900 A | 5/2000 |
| JP | 2000-229931 A | 8/2000 |
| JP | 2001-35004 A | 2/2001 |
| JP | 2001-063212 | 3/2001 |
| JP | 2001-158879 A | 6/2001 |
| JP | 2001-323179 A | 11/2001 |
| JP | 2002-21189 A | 1/2002 |
| JP | 2002-222542 A | 8/2002 |
| JP | 2002-298444 A | 10/2002 |
| JP | 2003-034078 | 2/2003 |
| JP | WO 03/097580 A1 | 11/2003 |
| JP | 2004-82635 A | 3/2004 |
| WO | WO 03/098617 A2 | 11/2003 |

* cited by examiner

OPTICAL INFORMATION RECORDING MEDIUM

BACKGROUND OF THE INVENTION

1. Field of the Invention

The present invention generally relates to a recordable optical information recording medium recordable by heat mode such as CD-R, DVD-R or DVD+R, which is capable of recording and reproduction by means of, for example, a laser light having a wavelength of 350 to 830 nm, which contains a certain organic dye together with a photostabilizer such as a specific aminium compound in the recording layer, and which is capable of particularly high speed recording and also has improved light resistance.

2. Description of the Related Art

As a means for recording and reproducing image data such as characters or graphics, or video or audio data, for example, optical disks known as CD-Rs, which have a recording layer containing pentamethine-based cyanine dye, are available as the recording media capable of recording and reproduction by means of a laser light having a wavelength of 770 to 830 nm. However, it is a recent trend to use DVD-Rs (Digital Video Disk-Recordable or Digital Versatile Disk-Recordable) which are capable of high density recording and reproduction by means of a red laser light having a shorter wavelength than the aforementioned laser light, for example, in the region of 620 to 690 nm, or the like as the next-generation media (optical information recording media) to replace CD-Rs. Moreover, media recordable at even higher density, which are capable of recording and reproduction by, means of so-called blue laser having a wavelength in the order of 400 nm, are also in practical use.

In regard to such CD-R, DVD-R or DVD+R, currently recording performance is being improved by employing in the recording layer an organic dye compound which is responsive to a semiconductor laser having a wavelength of 600 to 800 nm, particularly a wavelength of 640 to 680 nm, and which forms pits by thermal decomposition or the like in accordance with the signal of the information to be recorded, thereby allowing recording. Especially, cyanine dyes and azo dyes are being widely used, since they are advantageous in that a method of high productivity called spin coating can be applied to these dyes, their low heat conductivity enables local heating and therefore formation of pits having good dimensional stability with distinct edges, and in particular, they exhibit high absorption and reflection in the region of the wavelengths of semiconductor lasers.

However, such recordable optical information recording media such as CD-R, DVD-R or DVD+R have problems that when they contain cyanine dyes or general azo dyes in the recording layer, these dyes in general cannot be said to have sufficient light resistance and are susceptible to deterioration by sunlight. Also, they may not be adequate for long-term storage of the recorded material, they are susceptible to deterioration when repeatedly irradiated with laser light upon reproduction, and are likely to impair the quality of the reproducibility of image or sound resulting from reproduction.

As a countermeasure against these problems, it has been attempted to improve the recording layer of CD-R, DVD-R or DVD+R containing cyanine dye, by adding a photostabilizer (quencher) such as a stabilized radical to the main component of the cyanine dye which in general has characteristic absorption in the region of oscillation wavelength of semiconductors, and changing the singlet oxygen, for example, generated by sunlight, which causes discoloration of the dye, to a mild triplet oxygen by way of oxidation thereof. However, when it is desired to preserve recorded material such as the content of encyclopedia for a long time, it cannot be viewed that the improvement is sufficient. Moreover, addition of such photostabilizer causes so-called thermal interference which attenuates the feature of cyanine dye or azo dye that enables local heating, has adverse effect on the recording properties, and in particular, causes deterioration of the recording sensitivity or jitter.

In particular, for the CD-R, DVD-R or DVD+R to be used in the future, in order to perform recording efficiently, it is required from the organic dye compound currently used as the dye for the recording layer to enable speeding up of recording, and thus there is an increasing demand in the market on high speed recording such as 8 times speed as well as 16 times speed recording. In such high speed recording, it is needed to perform writing by irradiating the recording layer with laser light at high speed. For this, increasing the scanning speed of the laser light is needed, and consequently the amount of energy per unit time required for the writing is to be reduced. When it is desired that good pits be formed as the signal for the information to be recorded, it is necessary either to use an organic dye having good reactivity (the ability to degrade and volatilize) which would be able to form good pits even with low energy, to design a material constitution comprising an organic dye and a photostabilizer, or to perform recording with powering up of the irradiated laser light so as to compensate for the reduction in the amount of energy, that is, with so-called formation of pits with high power, or to carry out a few of the above means in combination. In this case, addition of the above-mentioned photostabilizer to cyanine dye faces problems such as that the aforementioned thermal interference is liable to occur and light resistance is not satisfactory, and thus device on the photostabilizer is in need.

As a measure for such photostabilizer, it is disclosed in the description of the publication of JP-A-3-164292 that when a diimmonium compound in which the anionic portion is a transition metal complex is added to the cyanine dye, light resistance is significantly enhanced, as compared with the case of adding a conventional diimmonium compound in which the anionic portion is an inorganic anion instead. Further, it is disclosed in the publications of JP-A-5-148193 and JP-A-5-178808 that addition of a special aminium salt compound and a diimmonium salt (all being substituted with at least one alkoxyalkyl group or alkynyl group) to organic dye results in excellent light resistance, as compared with the case of adding a conventional diimonium salt (having none of the substituent alkoxyalkyl group or alkynyl group) instead.

However, with the recording layer formed from the aforementioned addition of an aminium salt compound or a diimonium compound (diimmonium compound) to a cyanine dye or an azo dye as the photostabilizer, it is not possible to solve the above-mentioned problem, that is, the problem that such addition is still unsatisfactory in realizing, so to speak, the conflicting performance that in order to let the recording layer cope with high speed recording, on one hand, the response of the recording layer to laser light in writing should be enhanced, while on the other hand, the response of the recording layer to any external light such as sunlight should be suppressed to suppress light-induced discoloration.

SUMMARY OF THE INVENTION

In an embodiment, It is an object of the present invention to provide an optical information recording medium with which high speed recording can be favorably carried out with respect to a laser light having a wavelength selected from the region of approximately 350 nm to 830 nm.

In an embodiment, another object of the invention is to provide an optical information recording medium which can prevent deterioration due to photo/thermal interference and also does not impair the performance in recording and reproduction, upon long-term storage or heavily repeated reproduction.

In an embodiment, another object of the invention is to provide an optical information recording medium to which virtually all of the conventional preparation processes for CD-R, DVD-R or DVD+R can be applied without significant modifications.

The inventors devotedly carried out research to solve the above-mentioned problems. As a result, they found that a recording layer containing a cyanine dye or an azo dye, to which an aminium compound having a substituted alkyl group with a terminal cyano group, a diimonium compound or a special azo compound has been added, shows high response to a laser light of a wavelength in the region of approximately 350 nm to 830 nm, can be made to have capability for high speed recording at an 8 times or higher speed with, for example, DVD-R and DVD+R, and has excellent light resistance (light fastness) as well, thus completing the invention.

In an embodiment which achieves one or more of the above objects, the invention is to provide (1) an optical information recording medium having light interference layers including a recording layer on a substrate, wherein the recording layer comprises an organic dye and contains as the photostabilizer at least one selected from the group consisting of the compounds respectively represented by the following formula 1, formula 2, formula 3, formula 4 and formula 5:

[Chemical formula 1]

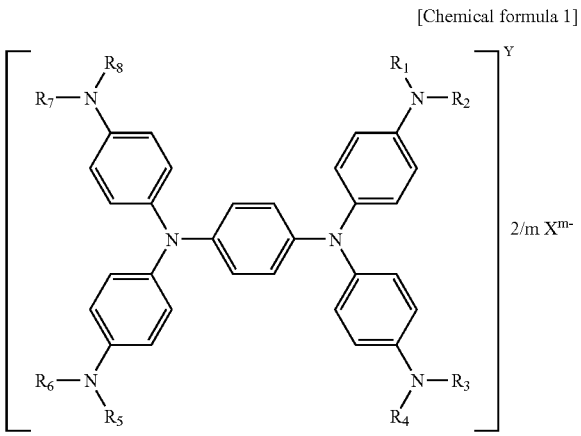

wherein $R_1$ to $R_8$ are such that at least one of these substituents represents a substituted alkyl group having a terminal cyano group; the other substituents among $R_1$ to $R_8$ each represent a different substituent including a linear or branched alkyl group or a hydrogen atom; Y represents 1+ (monovalent cation) or 2+ (divalent cation); $X^{m-}$ represents an anion; and m represents 1 or 2.

[Chemical formula 2]

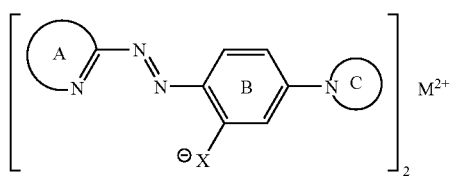

wherein ring A represents a heterocyclic ring formed with the carbon atom and the nitrogen atom to which the ring is bonded; ring B represents a benzene ring which may be substituted; ring C represents a heterocyclic ring including the nitrogen atom to which the ring is bonded, while this ring may be bonded to ring B; $X^-$ represents a group which can have active hydrogen; $M^{2+}$ represents a divalent metal cation; and the whole compound represents a metal complex in which two molecules of the entire anion as the azo dye molecule are bonded to 1 molecule of $M^{2+}$.

[Chemical formula 3]

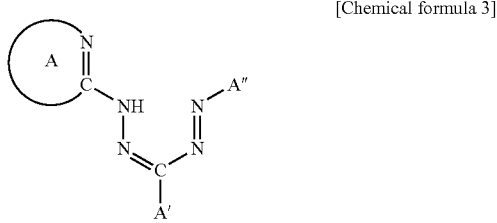

wherein ring A represents a substituted or unsubstituted, 5- or 6-membered heterocyclic ring containing a nitrogen atom, while this nitrogen-containing heterocyclic ring may be condensed with another ring; A' represents an alkyl group, an aryl group, an alkylcarbonyl group, an arylcarbonyl group, an alkenyl group, a heterocyclic group or an alkoxycarbonyl group, each of which may be substituted; A" represents an alkyl group, an alkenyl group or an aryl group, each of which may be substituted; and the compound in which the above-represented molecule is bonded to a metal ion represents a formazan metal chelate compound.

[Chemical formula 4]

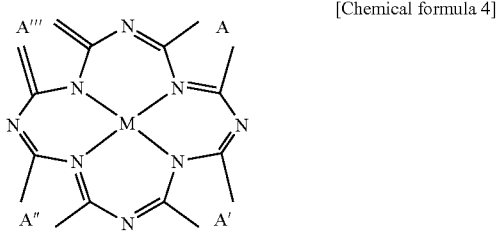

wherein M represents two hydrogen atoms, a divalent metal atom, a trivalent or tetravalent substituted metal atom or an oxy metal; and A, A', A" and A'" each independently represents a substituent.

[Chemical formula 5]

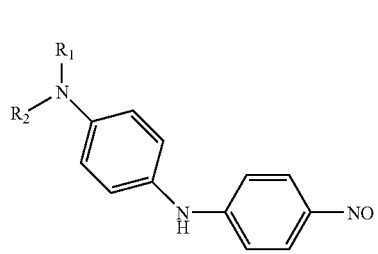

wherein $R_1$ and $R_2$ each independently represents a substituent.

Further, in other embodiments, the invention is also to provide (2) an optical information recording medium having light interference layers including a recording layer on a substrate, wherein the recording layer comprises a cyanine dye or an azo dye as an organic dye and contains the compound represented by the formula 1 or formula 2 as a photostabilizer; (3) an optical information recording medium having light interference layers including a recording layer on a substrate, wherein the recording layer comprises a cyanine dye or an azo dye as an organic dye and contains the compounds respectively represented by the formula 1 and the formula 2 as a photostabilizer; and (4) the optical information recording medium according to any one of (1) to (3) above, wherein the compound of the formula 1, wherein Y is 1+, is the aminium compound represented by the following formula 6, and the compound of the formula 1, wherein Y is 2+, is the diimonium compound represented by the following formula 7:

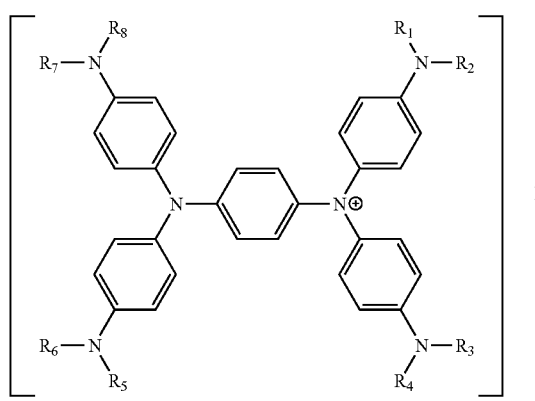

wherein $R_1$ to $R_8$ have the same meaning as defined for the formula 1; and $X^-$ represents an anion selected from the group consisting of anions of a halide ion, $PF_6^-$, perchlorate, hydrofluoroborate, phosphate, benzenesulfonate, $SbF_6^-$, toluenesulfonate, alkylsulfonate, benzenecarboxylate, alkylcarboxylate, trifluoromethylcarboxylate, periodate, $SCN^-$, tetraphenylborate and tungstate.

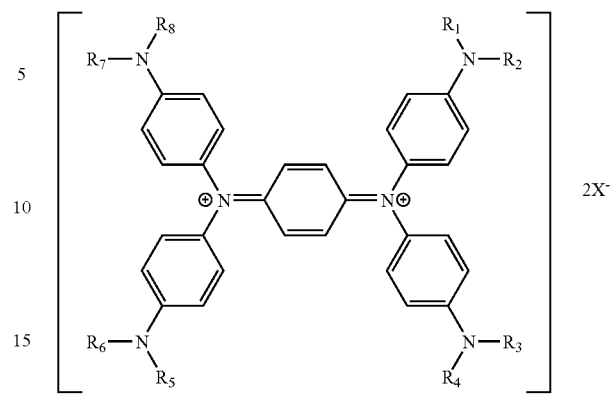

wherein $R_1$ to $R_8$ and $X^-$ have the same meaning as defined for the formula 6.

In other embodiments, the invention is also to provide (5) the optical information recording medium according to (4) above, wherein with respect to the formula 6 and the formula 7, at least half of $R_1$ to $R_8$ represent a linear or branched, substituted lower alkyl group having a terminal cyano group; (6) the optical information recording medium according to any one of (1) to (5) above, wherein the compound represented by the formula 1 is used in an amount of 20% by weight or less relative to the organic dye; (7) the optical information recording medium according to any one of (1) to (5) above, wherein the azo dye as the organic dye is identical to the compound represented by the formula 2 as a photostabilizer, and when a photostabilizer other than the aforementioned photostabilizer is used, the photostabilizer is used in an amount of 20% by weight or less relative to the organic dye; and (8) the optical information recording medium according to any one of (1) to (7) above, which is used for high speed recording at an 8 times or higher speed.

For purposes of summarizing the invention and the advantages achieved over the related art, certain objects and advantages of the invention have been described above. Of course, it is to be understood that not necessarily all such objects or advantages may be achieved in accordance with any particular embodiment of the invention. Thus, for example, those skilled in the art will recognize that the invention may be embodied or carried out in a manner that achieves or optimizes one advantage or group of advantages as taught herein without necessarily achieving other objects or advantages as may be taught or suggested herein.

Further aspects, features and advantages of this invention will become apparent from the detailed description of the preferred embodiments which follow.

BRIEF DESCRIPTION OF THE DRAWINGS

These and other features of this invention will now be described with reference to the drawings of preferred embodiments which are intended to illustrate and not to limit the invention.

DETAILED DESCRIPTION OF PREFERRED EMBODIMENTS

Figure 1:
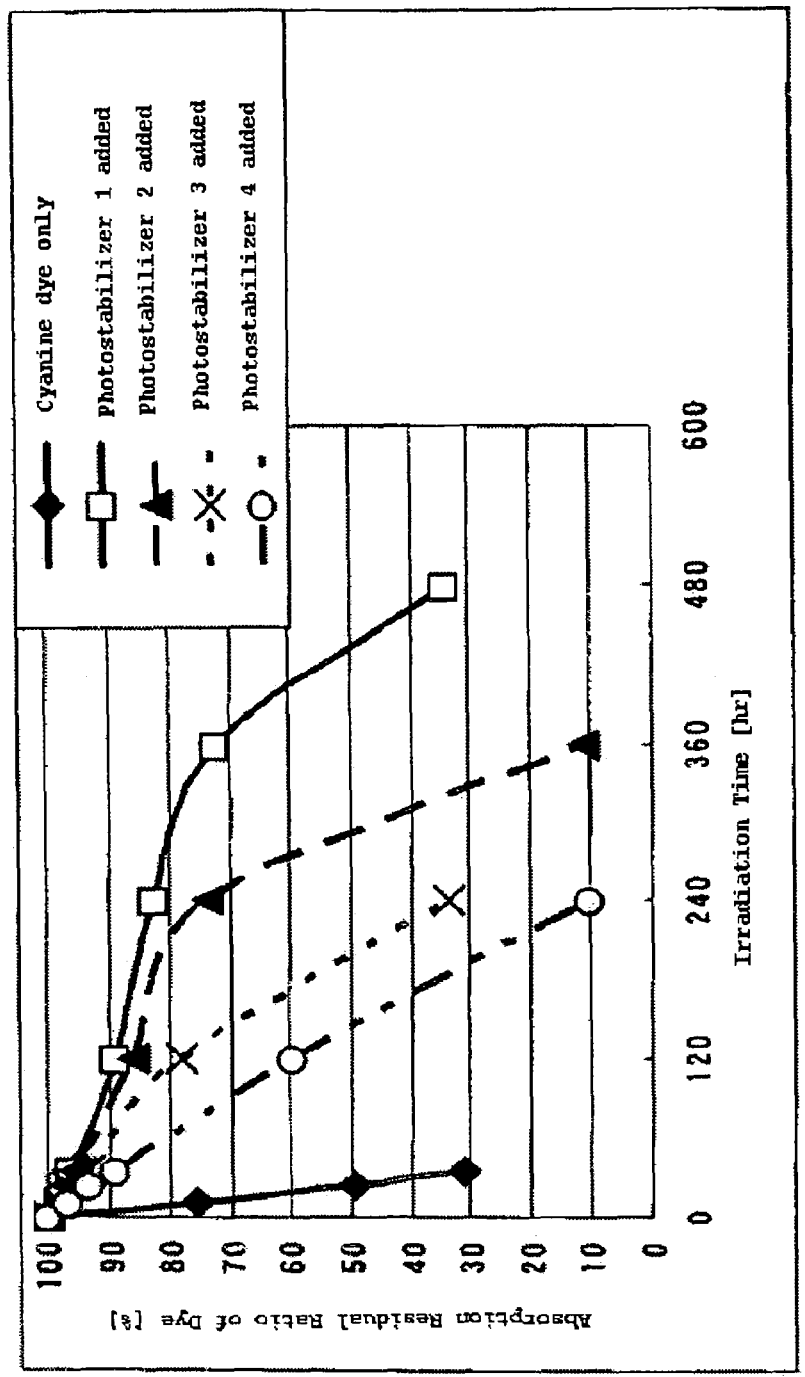
FIG. 1 is a graph obtained by plotting the measurement values of Table 1.

Although the manner of conceiving the invention or the theories of mechanisms described below are not intended to limit the invention, on the occasion of achieving the invention, required functions of the photostabilizer were investigated to eventually find the following.

To speak in general, in order to add a photostabilizer to an organic dye compound and use them as the materials to constitute a recording layer, and to enhance the light fastness, when the proportion of the organic dye compound among the two components is increased while the proportion of the photostabilizer is decreased, the response of the recording layer to the writing laser light becomes good, thereby the layer being capable of coping with high speed recording. On the other hand, however, the light resistance (light fastness) against sunlight or the like is deteriorated, and the storage stability as an optical information recording medium is lowered.

There, the photostabilizer must have a prominent effect of light resistance that would allow lowering of the influence of light other than the writing laser light such as sunlight, that is, an effect which suppresses light-induced deterioration of the photostabilizer itself, and which is also helpful, when the photostabilizer is used in combination with an organic dye, in suppressing light-induced discoloration of the organic dye. Further, since an optical information recording medium has significance particularly in the storage of information after writing it therein, it is also important to improve the so-called storage stability of the medium particularly effectively, by which the configuration of pit corresponding to the recorded signal does not change.

As such, in order to achieve a balance between high speed recording and high reliability on light resistance, (i) a photostabilizer which can effectively improve light-induced deterioration (light-induced discoloration) of the organic dye included in the recording layer materials (an additive capable of improving storage stability) is employed; and (ii) the storage stability after recording is particularly effectively improved.

In designing the photostabilizer of (i) above, which can effectively improve light-induced deterioration (light-induced discoloration) of organic dye, a photostabilizer that can satisfy the following conditions is used:

(A) it has a high effect of suppressing light-induced deterioration with respect to the organic dye; and (B) it exerts a sustained effect so as to make deterioration of the photostabilizer itself difficult.

Also, in designing the photostabilizer of (ii) above, which can effectively improve the storage stability after recording, it is important that the photostabilizer is capable of suppressing deterioration of the recorded parts (pits), and thus use is made of a photostabilizer that can satisfy that:

(C) it has a high effect of suppressing pit deterioration.

Under such fundamental understanding, it is possible according to the invention to provide an optical information recording medium having the capability for high speed recording and high light fastness, by adding to an organic dye, in particular a cyanine dye or an azo dye, and using in combination with it each of the following: as the photostabilizer satisfying the above-described conditions (A) and (C), the compound of the formula 1, particularly the aminium compound of the formula 6, and the diimonium compound of the formula 7; as the photostabilizer satisfying the above-described condition (B), the metal-containing azo compound of the formula 2, the formazan metal chelate compound (dye) of the formula 3, and the phthalocyanine compound of the formula 4; as the photostabilizer satisfying the above-described condition (C), the phthalocyanine compound of the formula 4, and the nitrosodiphenylamine compound of the formula 5; and also combinations of several of these. Especially, by using a photostabilizer having the aforementioned functions of (A), (B) and (C), such performance can be even further enhanced.

Based on these, an investigation on the design of photostabilizer was carried out, and the following results were confirmed.

(I) As to the designing of the photostabilizer of (i) above, which can effectively improve light-induced deterioration (light-induced discoloration) of organic dye (use of a photostabilizer satisfying (A) and (B) above)

As a result of diligent research, it was found that regardless of whether the function of preventing light-induced deterioration of organic dye is good or poor, photostabilizers may be classified broadly into one which, upon exhibition of the photostabilizing function, gradually loses the photostabilizing effect, and one which does not lose the effect and maintains it for long; and that light-induced deterioration of an organic dye can be prevented over a long time by combining a photostabilizer having high function of preventing light-induced deterioration of organic dye with a photostabilizer which does not lose the photostabilizing effect and maintains it long. Thus, the storage stability for a recorded material of the medium (optical information recording medium) before recording (hereinafter, simply referred to "storage stability") could be enhanced.

However, although the storage stability of the medium after recording may be improved only with the above-described matter, still there is a need for further enhancement. In this regard, the thought was brought up that since the difference in the medium between before recording and after recording lies only in the presence or absence of the recorded parts (pits) on the recording layer, consideration must be given to the change upon formation of pits in the behavior of light-induced deterioration of organic dye, particularly on the periphery of the pits. Thus, the following conclusion was reached.

(II) As to the designing of the photostabilizer of (ii) above, which can effectively improve the storage stability after recording (use of a photostabilizer satisfying (C) above)

The significance of an optical recording medium lies especially in the storage of information after writing therein (Archival Life). Therefore, in order to particularly effectively improve the storage stability after recording, there is needed a devisal to preserve the recording marks (recording pits) stably over a long time. Since the recording pits are formed as a result of decomposition and volatilization of an organic dye in the organic dye film constituting the recording layer due to the heat generated upon irradiation of the recording layer with a laser light for writing, there remains a lot of the decomposition product (thermal decomposition product) of the organic dye which could not be completely volatilized in the pit areas. Thus, it was confirmed that light-induced deterioration of an organic dye in the organic dye film in the vicinity of pits is facilitated by the remnants of this thermal decomposition product; in other words, that the vicinity of the recording pit areas is liable to undergo light-induced deterioration as compared with the non-recorded areas, and this leads to collapse of the periphery of pits and indistinct pit boundaries, thereby causing malfunction in signal reading. In order to avoid this problem, a photostabilizer which diminishes the influence of the facilitation of light-induced deterioration caused by the thermal decomposition product may be used to enhance the storage stability of the recorded material in the optical information recording medium.

As a result of diligent study, it was confirmed by using an analytic device such as high speed liquid chromatography that the thermal decomposition product of organic dye was staying behind in the pit areas. It was also found that this thermal decomposition product had the function of facilitating light-induced deterioration of organic dye in its vicinity, and thus the vicinity of the recording pit areas was liable to undergo light-induced deterioration as compared with the non-recorded areas. As the effect of facilitating light-induced deterioration by this thermal decomposition product is defined clearly, a photostabilizer which can effectively prevent the effect of the thermal decomposition product can be found and used to enhance the storage stability of the medium after recording.

Designing of a photostabilizer in both aspects of (I) and (II) above can lead to enhancement of the storage stability of the medium, regardless of whether the state of medium being before recording or after recording. The results testifying the above by experimentation are presented below.

(Method of Experiment)

A thin film of organic dye which is similar to the recording layer used in an optical medium (optical disk) such as DVD-R, was formed by applying a dye solution having a mixture of an organic dye and a photostabilizer dissolved therein (a 1.5% by weight solution of the organic dye) on a single plate of polycarbonate by spin coating. By irradiating the thin film of organic dye with xenon light for a certain time, the absorption spectra of the organic dye film of before and after irradiation were measured with a spectrophotometer to study the behavior of light-induced deterioration.

With regard to the respective experimental results, as shown in the table, the numerical values in the table (absorption residual ratio of the dye) indicate the ratios of the intensity of absorption spectrum (Abs.) of the dye film after irradiation when the intensity of absorption spectrum (the absorption intensity (Abs.) at the maximum wavelength ($\lambda_{max}$)) before irradiation (time of irradiation: 0 hr) is taken as 100.

(Results of Experiment)

Verification of (I)

(A) As to the behavior of light-induced deterioration upon mixing of a cyanine dye (of the following formula 8) with 10% by weight each of an aminium compound of the following formula 9 (Photostabilizer 1), a diimonium compound of the following formula 10 (Photostabilizer 2), and a nitrosodiphenylamine compound of the following formula 12 (Photostabilizer 4)

The experimental results are given in Table 1, and a graph obtained therefrom is presented in FIG. 1.

Here, in the Table and FIG. 1, the term "Cyanine dye only" of a denotes the use of a dye solution (1.5% by weight dye solution) having only the dye dissolved without any photostabilizer added, and the term "Photostabilizer 1 added" of b denotes the addition of the above-mentioned Photostabilizer 1 (from "Method of Experiment" in the above), this being also applicable to c, d and e. Further, as a reference, the photostabilizing effect of a dithiolate-metal complex of the following formula 11 (Photostabilizer 3) was also verified in the same manner as with other photostabilizers. However, an effect as expected was not obtained.

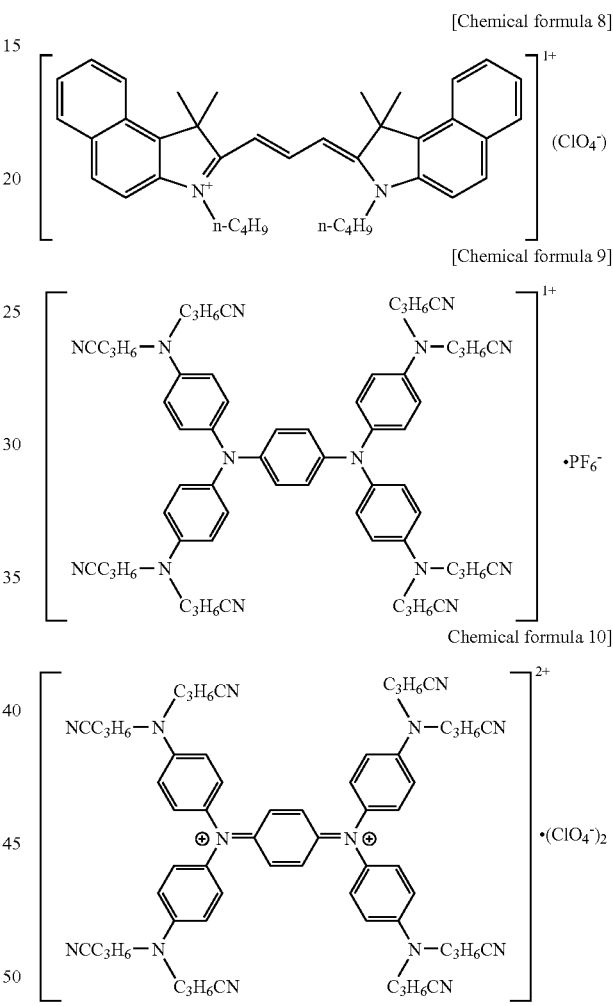

TABLE 1

| | Irradiation time [hr] | | | | | | | |
|---|---|---|---|---|---|---|---|---|
| | 0 | 12 | 24 | 36 | 120 | 240 | 360 | 480 |
| a Cyanine dye only | 100 | 75.7 | 49.6 | 31.1 | | | | |
| b Photostabilizer 1 added | 100 | 98.1 | 97.6 | 96.0 | 88.9 | 82.4 | 72.3 | 33.9 |
| c Photostabilizer 2 added | 100 | 98.1 | 97.2 | 95.7 | 86.0 | 73.9 | 11.2 | |
| d Photostabilizer 3 added | 100 | 98.0 | 96.7 | 93.4 | 78.3 | 33.4 | | |
| e Photostabilizer 4 added | 100 | 96.4 | 93.3 | 89.0 | 59.5 | 10.3 | | |

-continued

[Chemical formula 11]

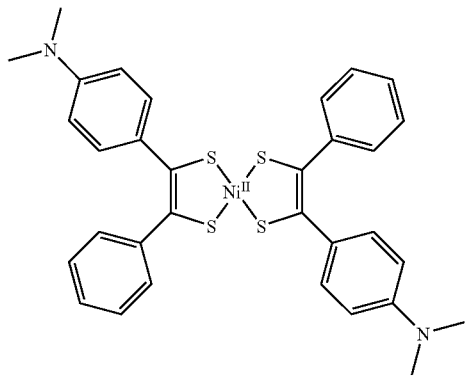

[Chemical formula 12]

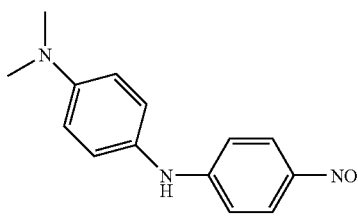

stabilizing effect exhibits a virtually uniform stabilizing effect until 360 hours of irradiation time, but the light-induced deterioration is accelerating over the period of 360 hours to 480 hours. In order to interpret this phenomenon, the state of Photostabilizer 1 was checked with its absorption spectrum, and it was found that the photostabilizer itself was deteriorating. From this, it can be viewed that a photostabilizer having high light resistance per se would have a high photostabilizing effect.

(B) As to the behavior of light-induced deterioration upon mixing of a metal-containing azo dye (of the following formula 13) as the organic dye with 10% by weight each of the aforementioned Photostabilizers 1 to 4

[Chemical formula 13]

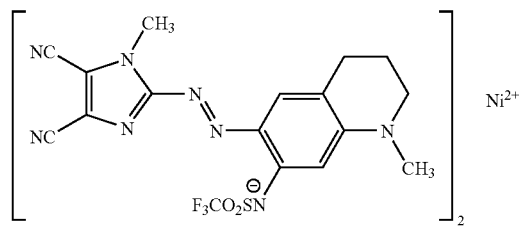

As shown in Table 1 and the graph of FIG. 1, the time for the residual ratio of the dye to reach 50% was 24 hr for a, 432 hr for b, 293 hr for c, 198 hr for d and 145 hr for e.

As such, it can be seen that the stabilizing effect may be high or low, depending on the type of photostabilizer. The compound under "Photostabilizer 1 added" of b having a high The experimental results are given in Table 2, and a graph obtained therefrom is presented in FIG. 2.

TABLE 2

| | | Irradiation time [hr] | | | | | | | | | |
|---|---|---|---|---|---|---|---|---|---|---|---|
| | | 0 | 12 | 24 | 36 | 120 | 240 | 360 | 480 | 720 | 1080 | 1440 |
| f | Azo dye only | 100 | 99.4 | 97.0 | 95.2 | 89.1 | 79.4 | 68.9 | 60.1 | 45.5 | | |
| g | Photostabilizer 1 added | 100 | 99.8 | 98.9 | 98.3 | 96.5 | 93.3 | 88.7 | 85.2 | 76.7 | 60.1 | 39.9 |
| h | Photostabilizer 2 added | 100 | 99.7 | 98.0 | 97.1 | 94.2 | 90.1 | 84.8 | 79.9 | 70.3 | 52.1 | 29.8 |
| i | Photostabilizer 3 added | 100 | 99.1 | 98.1 | 96.4 | 92.0 | 84.3 | 74.6 | 65.8 | 50.4 | 30.7 | |
| j | Photostabilizer 4 added | 100 | 99.0 | 98.3 | 96.6 | 91.6 | 85.6 | 76.2 | 66.6 | 52.3 | 29.4 | |

From Table 2, it can be seen that although the metal-containing azo dye has higher light resistance than the cyanine dye in the respective cases of being used individually, when used together with a photostabilizer, the photostabilizer shows the photostabilizing effect in the same way as in the case of the cyanine dye.

Figure 3:
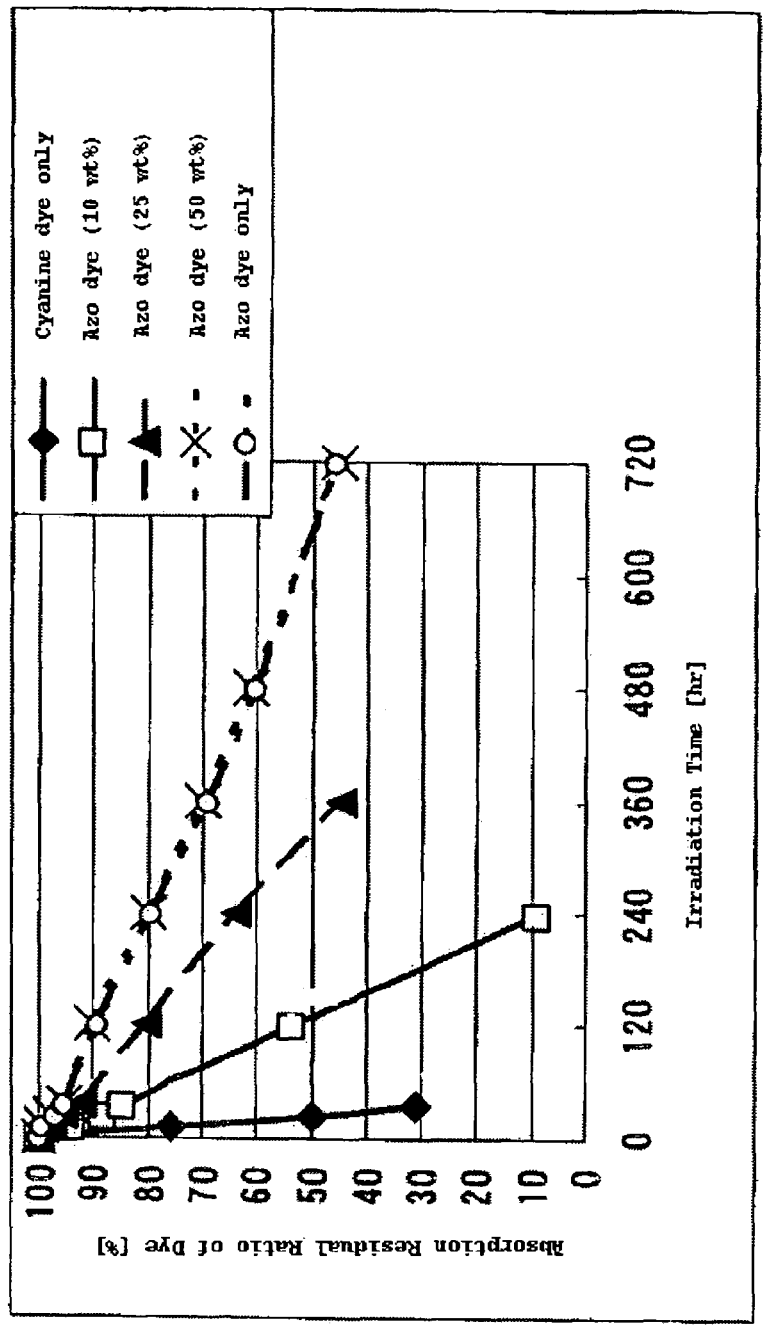
FIG. 3 is a graph obtained by plotting the measurement values of Table 3.

(C) As to the behavior of light-induced deterioration upon mixing of a cyanine dye (of the formula 8) with 10% by weight, 25% by weight and 50% by weight, respectively, of a metal-containing azo dye (of the formula 13) (Photostabilizer 5) as the photostabilizer The experimental results are as shown in Table 3, and a graph obtained therefrom is presented in FIG. 3.

TABLE 3

| | | Irradiation time [hr] | | | | | | | |
|---|---|---|---|---|---|---|---|---|---|
| | | 0 | 12 | 24 | 36 | 120 | 240 | 360 | 480 | 720 |
| k | Cyanine dye only | 100 | 75.7 | 49.6 | 31.1 | | | | | |
| l | Azo dye (10% by weight) | 100 | 93.8 | 88.2 | 84.6 | 53.4 | 8.6 | | | |
| m | Azo dye (25% by weight) | 100 | 97.5 | 95.1 | 92.1 | 80.1 | 63.6 | 44.5 | | |
| n | Azo dye (50% by weight) | 100 | 99.4 | 97.7 | 95.2 | 90.0 | 79.9 | 69.9 | 61.2 | 45.3 |
| o | Azo dye only | 100 | 99.4 | 97.0 | 95.2 | 89.1 | 79.4 | 68.9 | 60.1 | 45.5 |

Figure 2:
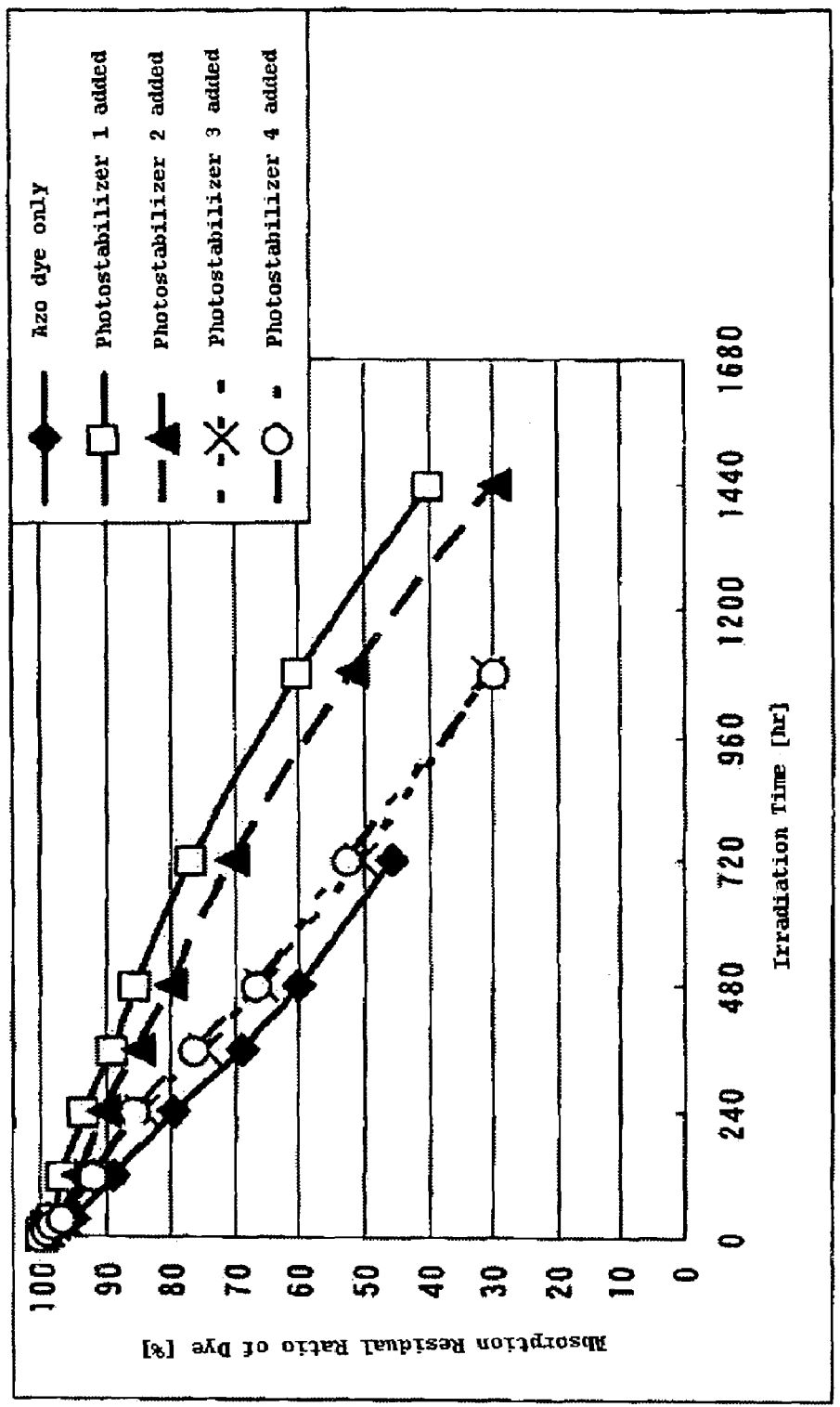
FIG. 2 is a graph obtained by plotting the measurement values of Table 2.

From Table 3 and FIG. 2, the terms "Cyanine dye only" and "Azo dye only" denote the use of dye solutions (1.5% by weight dye solution), one having the former dye of the formula 8 dissolved and the other having the latter dye of the formula 13 dissolved, both without any photostabilizer added; and the term "Azo dye (10% by weight)" denotes the use of a dye solution formed by mixing and dissolving in the solution of "Cyanine dye only", 10% by weight of the metal-containing azo dye of the formula 13 relative to the dye (the dye of the formula 8), this being also applicable to the terms "Azo dye (25% by weight)" and "Azo dye (50% by weight)".

From Table 3 and the graph of FIG. 2, the sample of "Azo dye (50% by weight)" has a light resistance equivalent to the sample of "Azo dye only", and thus improvement of the light resistance is maximal as compared with the sample of "Cyanine dye only". However, the samples of "Azo dye (10% by weight)" and "Azo dye (25% by weight)" also show gradual improvement in light resistance. Therefore, it can be seen that the metal-containing azo dye exhibits the stabilizing effect nearly uniformly.

Figure 4:
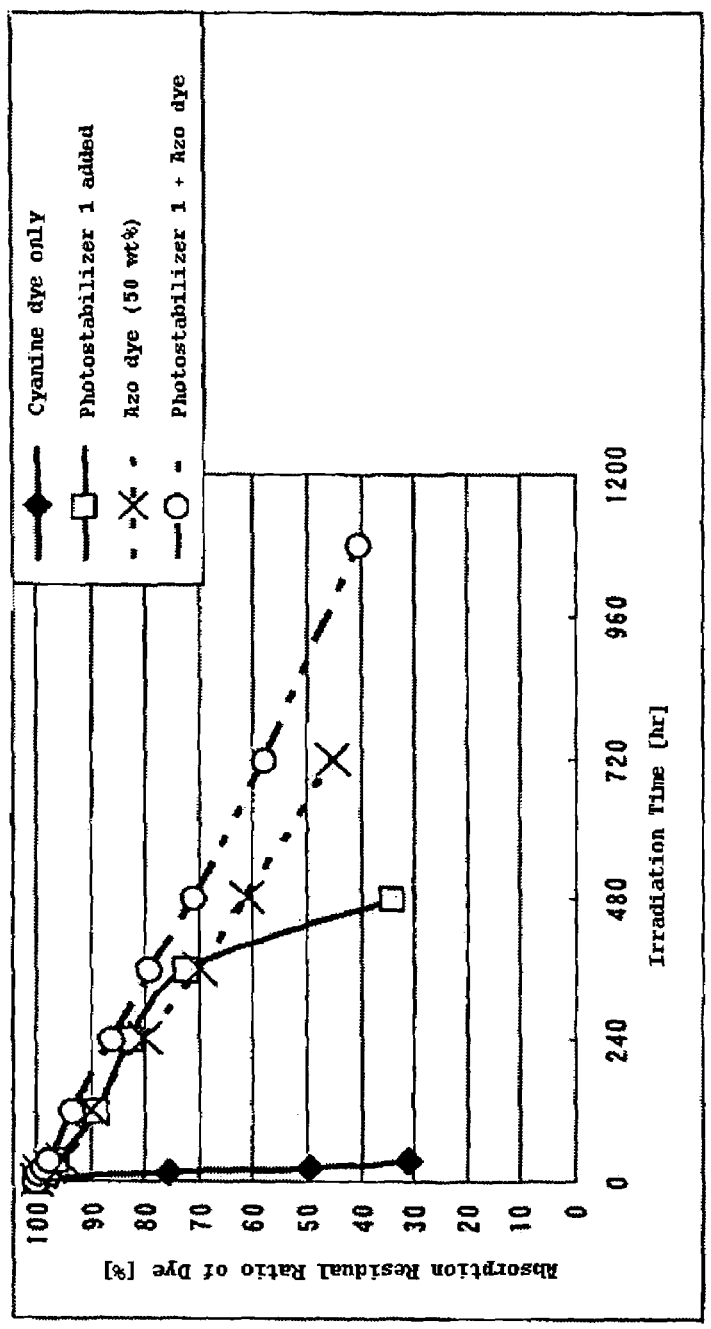
FIG. 4 is a graph obtained by plotting the measurement values of Table 4.

(D) As to the behavior of light-induced deterioration upon mixing of a cyanine dye (of the formula 8) simultaneously with 10% by weight each of the aforementioned Photostabilizer 1 and Photostabilizer 5 as the photostabilizer The experimental results are as shown in Table 4, and a graph obtained therefrom is presented in FIG. 4.

TABLE 4

| | | Irradiation time [hr] | | | | | | | | |
|---|---|---|---|---|---|---|---|---|---|---|
| | | 0 | 12 | 24 | 36 | 120 | 240 | 360 | 480 | 720 | 1080 |
| p | Cyanine dye only | 100 | 75.7 | 49.6 | 31.1 | | | | | | |
| q | Photostabilizer 1 added | 100 | 98.1 | 97.6 | 96.0 | 88.9 | 82.4 | 72.3 | 33.9 | | |
| r | Azo dye (50% by weight) | 100 | 99.4 | 97.7 | 95.2 | 90.0 | 79.9 | 69.9 | 61.2 | 45.3 | |
| s | Photostabilizer 1 + Azo dye | 100 | 99.7 | 98.6 | 97.7 | 93.4 | 85.9 | 78.9 | 70.8 | 57.6 | 40.3 |

From Table 4 and FIG. 3, the samples of "Cyanine dye only" and "Photostabilizer 1 added" have the same meaning as defined in (A) above, "Azo dye (50% by weight)" has the same meaning as defined in (C) above, and "Photostabilizer 1+Azo dye" denotes the use of a solution formed by further mixing 10% by weight of Photostabilizer 5 relative to the cyanine dye, with the solution of "Photostabilizer 1 added".

From Table 4 and the graph of FIG. 3, it can be seen that the sample of "Photostabilizer 1+Azo dye" has a light resistance improved over the sample of "Azo dye (50% by weight)", and the former exhibits a photostabilizing effect which is maintained higher than a certain level over a long time, owing to the synergistic effect of Photostabilizer 1 and the metal-containing azo dye. As such, it can be seen that light-induced deterioration of an organic dye can be improved effectively by combining a photostabilizer having high photostabilizing effect and a photostabilizer exhibiting a sustained photostabilizing effect for long.

Verification of (II)

Verification of the susceptibility of the remnants of the thermal decomposition product to deterioration of dye in the vicinity of the recording pits (E) As to the behavior of light-induced deterioration upon mixing of a cyanine dye (of the formula 8) with its thermal decomposition product A cyanine dye (of the formula 8) was heated at 300° C. which is a temperature higher than its thermal decomposition temperature (255° C.), to obtain a thermal decomposition product that did not volatilize and stayed behind. The thermal decomposition product was mixed with the cyanine dye (of the formula 8) in the amounts of 10% by weight, 20% by weight and 30% by weight, respectively, relative to the cyanine dye, and dye solutions containing the respective mixtures were used in the evaluation of the behavior of light-induced deterioration as described in the above.

Figure 5:
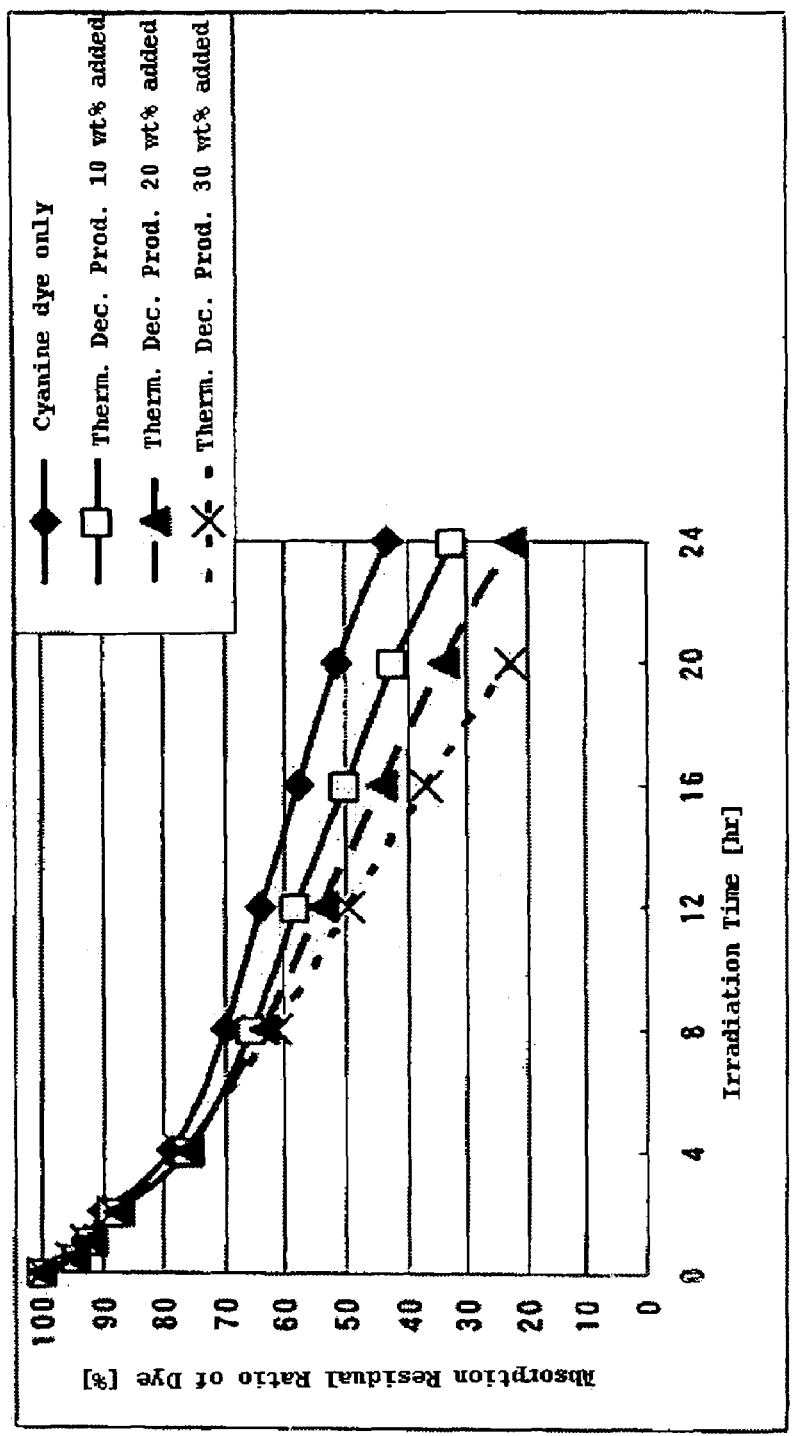
FIG. 5 is a graph obtained by plotting the measurement values of Table 5.
Figure 6:
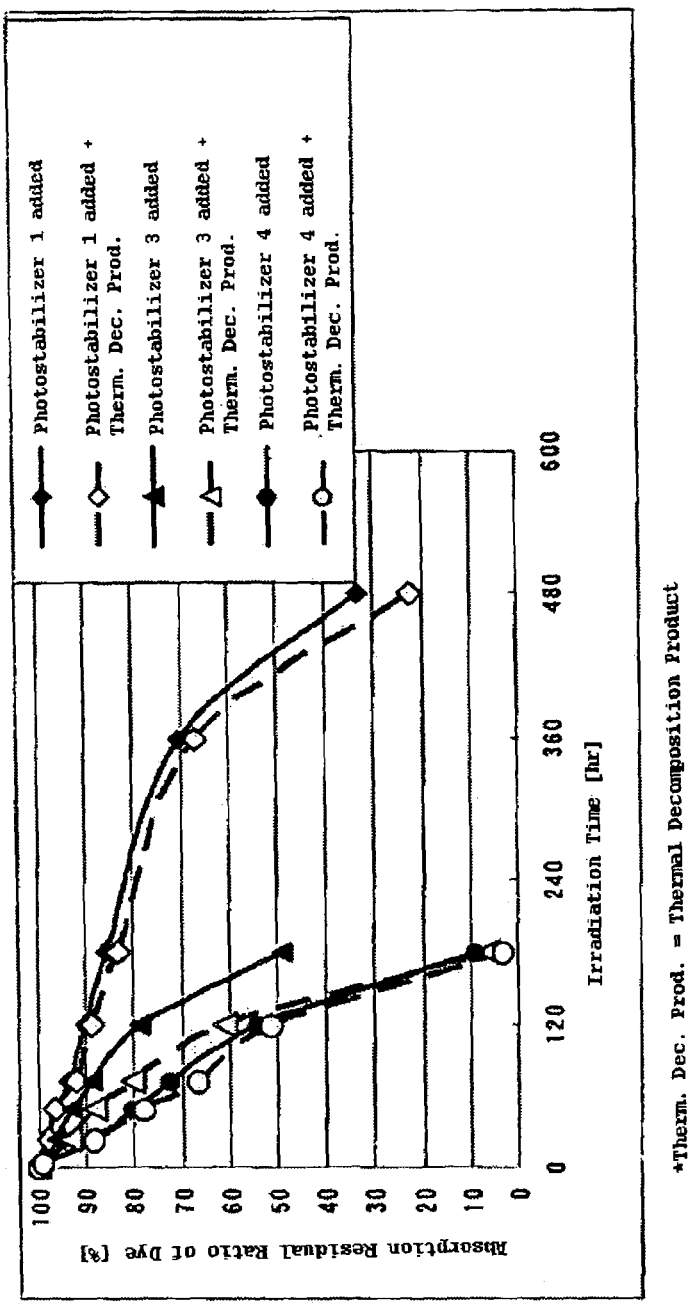
FIG. 6 is a graph obtained by plotting the measurement values of Table 6.

The experimental results are given in Table 5, and a graph obtained therefrom is presented in FIG. 5.

with 10% by weight, relative to the cyanine dye, of the thermal decomposition product of the dye, this being also applicable to "20% by weight of thermal decomposition product added" and "30% by weight of thermal decomposition product added".

From the results of Table 5, it can be seen that light-induced deterioration is facilitated with the addition of the thermal decomposition product From this, it is known that the recording pit areas where thermal decomposition product is present in abundance are susceptible to light-induced deterioration as compared with the non-recorded areas.

Next, in order to confirm whether the effect of this thermal decomposition product can be suppressed by the addition of photostabilizer, the thermal decomposition product was added to the cyanine dye, and the behavior of light-induced deterioration upon further addition of photostabilizer was investigated.

(F) As to the behavior of light-induced deterioration upon mixing of a cyanine dye (of the formula 8) with its thermal decomposition product and a photostabilizer A dye solution containing a mixture of a cyanine dye (of the formula 8) with 10% by weight of Photostabilizer 1 and 30% by weight of the aforementioned thermal decomposition

TABLE 5

| | | Irradiation Time [hr] | | | | | | | | |
|---|---|---|---|---|---|---|---|---|---|---|
| | | 0 | 0.5 | 1 | 2 | 4 | 8 | 12 | 16 | 20 | 24 |
| t | Cyanine dye only | 100 | 94.5 | 92.5 | 89.8 | 78.9 | 69.8 | 64.2 | 57.6 | 51.6 | 43.3 |
| u | 10% by weight of therm. dec. prod. added | 100 | 94.4 | 91.9 | 88.2 | 76.1 | 65.5 | 58.2 | 49.8 | 42.1 | 32.8 |
| v | 20% by weight of therm. dec. prod. added | 100 | 94.6 | 91.7 | 87.4 | 76.1 | 63.5 | 53.8 | 44.3 | 34.0 | 22.7 |
| w | 30% by weight of therm. dec. prod. added | 100 | 95.0 | 92.6 | 88.2 | 77.2 | 61.8 | 49.4 | 36.8 | 22.8 | |

From the table, "Cyanine dye only" has the same meaning as defined for "Cyanine dye only" in (A) above; and the term "10% by weight of thermal decomposition product added" denotes the use of a dye solution prepared by using a mixture of the dye solution of the aforementioned "Cyanine dye only"

product was prepared, and this dye solution was used in the evaluation of the behavior of light-induced deterioration as described in the above.

The experimental results are given in Table 6, and a graph obtained therefrom is presented in FIG. 5.

TABLE 6

| | | Time | | | | | | | | |
|---|---|---|---|---|---|---|---|---|---|---|
| | | 0 | 4 | 24 | 48 | 72 | 120 | 180 | 360 | 480 |
| x-1 | Photostabilizer 1 added | 100 | 100.3 | 97.8 | 96.6 | 93.8 | 90.2 | 85.6 | 70.2 | 33.3 |
| x-2 | Photostabilizer 1 added + Therm. dec. prod. | 100 | 100.4 | 97.9 | 96.4 | 92.2 | 88.8 | 83.2 | 66.6 | 22.3 |
| y-1 | Photostabilizer 3 added | 100 | 100.0 | 96.4 | 93.0 | 88.7 | 78.9 | 48.9 | | |
| y-2 | Photostabilizer 3 added + Therm. dec. prod. | 100 | 100.0 | 93.4 | 87.9 | 80.4 | 60.8 | 6.6 | | |
| z-1 | Photostabilizer 4 added | 100 | 99.0 | 88.8 | 80.3 | 72.1 | 54.2 | 8.9 | | |
| z-2 | Photostabilizer 4 added + Therm. dec. prod. | 100 | 98.8 | 87.9 | 77.7 | 66.3 | 50.9 | 3.1 | | |

From the table, "Photostabilizer 1 added" of x-1 has the same meaning as defined for (a) in (A) above (10% by weight of Photostabilizer 1 mixed); and "Photostabilizer 1 added+ Thermal decomposition product" of x-2 denotes a dye solution obtained by further adding 30% by weight, relative to the cyanine dye, of the aforementioned thermal decomposition product to the dye solution from "Photostabilizer 1 added", this being also applicable to the following y-1 to z-2.

From Table 6, the respective time for the dye residual ratio to reach 50% is 433 hr for x-1, 416 hr for x-2, 178 hr for y-1, 136 hr for y-2, 127 hr for z-1 and 122 hr for z-2. It can be seen that in all cases, mixing of a cyanine dye with the thermal decomposition product facilitates light-induced deterioration despite the addition of photostabilizer, and that particularly in the case of Photostabilizer 3 (y-1, y-2), the difference between the samples is becoming larger (It is obviously superior to the sample of t in Table 5), but in the cases of Photostabilizer 1 (x-1, x-2) and of Photostabilizer 4 (z-1, z-2), the ratio for the facilitation of light-induced deterioration is fairly alleviated when mixed with the thermal decomposition product.

As described in (A) to (F) in the above, the storage reliability of a medium of before recording and after recording can be enhanced by using a photostabilizer which is highly effective in suppressing light-induced deterioration (light-induced discoloration) of an organic dye, and also in suppressing the facilitation of light-induced deterioration of the organic dye by the thermal decomposition product of the organic dye. As such photostabilizer, mention may be made of aminium compounds (the formula 1 and the formula 6), diimonium compounds (the formula 1 and the formula 6), metal-containing azo compounds (the formula 2), formazan metal chelate compounds (the formula 3), phthalocyanine compounds (the formula 4) and nitrosodiphenylamine compounds (the formula 5), and when these photostabilizers are added to an organic dye, in particular a cyanine dye or an azo dye, and used, both high speed recording and high storage stability can be achieved.

As described above, the compound represented by the formula 1, the aminium compound represented by the formula 6 and the diimonium compound represented by the formula 7, which can be used as the photostabilizer for an organic dye, are such that at least one of $R_1$ to $R_8$ is a substituted alkyl group having a terminal cyano (—CN) group, and a plurality of these groups may be identical or different substituted alkyl groups, this being also applicable to the substituted alkyl groups attached to the same nitrogen atom. It is also preferred that at least half of $R_1$ to $R_8$ are identical or different substituted alkyl groups, all of them are identical or different substituted alkyl groups, and the substituted alkyl group is a substituted lower alkyl group (5 or less carbon atoms). The other groups that do not correspond to the above among $R_1$ to $R_8$ may be substituents other than the substituted alkyl group having a terminal cyano (—CN) group, such as, for example, a hydrogen atom, an alkyl group other than a lower alkyl group, or the like. The alkyl group of the substituted alkyl group of $R_1$ to $R_8$ may be a linear or branched alkyl group. Its terminal substituted with a cyano group is preferably a terminal of the longest chain, but it may be also a terminal of a branch chain. When $R_1$ to $R_8$ are all alkyl groups, the desired effect with respect to (A) and (C) described above cannot be obtained, but the compound of such case may be partly used in combination.

In particular, the photostabilizer formed from a compound belonging to the formula 1, formula 6 or formula 7 is preferably added in an amount of 20% by weight or less, and more preferably 10% by weight or less, relative to the organic dye. If this amount is too small, the effect related to (A) and (C) above may be insufficient; while if the amount exceeds 20% by weight, the response of the organic dye to laser light may be weakened when the photostabilizer is applied together with the organic dye to form a recording layer, thus being unable to form predetermined pits. Therefore, the amount is preferably from 1 to 20% by weight, and more preferably from 2 to 10% by weight. In the case that an azo dye as the organic dye is identical to the compound represented by the formula 2 which is a photostabilizer, and a photostabilizer other than this photostabilizer is used, that photostabilizer is added in an amount of 20% by weight or less, preferably 10% by weight or less, and the amount is from 1 to 20% by weight, and preferably from 2 to 10% by weight For the metal-containing azo dye of the formula 2, ring A and ring C may be exemplified by nitrogen-containing heterocyclic rings, for example, the rings contained in the compounds described in the following Examples and nitrogen-containing heterocyclic rings similar to those; and $M^{2+}$ may be exemplified by divalent metal cations such as heavy metal ions including nickel ion.

In order to achieve the effects related to (A) to (C) described above and to obtain an optical information recording medium having the capability for high speed recording and high storage stability, it is preferred to use, for example, a compound belonging to the formula 1 and a compound belonging to the formula 2 in combination, and there are also combinations of other compounds. The ratio in weight of the compound belonging to the formula 2 is from 3 to 8, and preferably from 4 to 7, when the compound belonging to the formula 1 is 1.

According to the invention, a light interference layer is formed so as to enable recording and reproduction by a laser light of a wavelength selected from the region of approximately 350 nm to 830 nm, but this is to allow the light interference layer to be used for DVD-R with respect to a laser light having a wavelength in the region of about 640 nm to 680 nm, and for CD-R with respect to a laser light having a wavelength in the region of about 770 nm to 830 nm. Further, it will be possible in the future to apply the light interference layer to a medium which can cope with a laser of approximately 400 nm, namely, the so-called blue laser medium.

The above-described light interference layer generically refers to a group of layers including a recording layer comprising a single layer or a multilayer of dye which is constituted of a dye layer formed from an organic dye material and a layer formed from an organic or inorganic material other than the mentioned material, and thus is capable of pit formation upon irradiation with laser light; and besides this recording layer, an enhancing layer formed from, for example, a resin material in which its refractive index and film thickness are adjusted for the purpose of adjusting the optical properties of the optical information recording medium, as well as a substrate, a dye layer, an intermediate layer provided between dye layers when a plurality of dye layers are present, and the like. Moreover, the "dye layer formed from an organic dye material" may be a "recording layer containing an organic material," in which the organic material is not limited to organic dye materials, and colorless materials may be also used. The dye layer may be also colorless, but for convenience, such colorless layer may be also referred to as dye layer.

The organic dye contained in the dye layer constituting the above-mentioned recording layer may be preferably exemplified by cyanine dyes and azo dyes, without being limited to these.

The cyanine compound may be exemplified by the cyanine compounds represented by the following formula 14, and more preferably by the compounds represented by the following formula 15.

[Chemical formula 14]

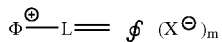

wherein $\Phi^+$ and $\phi$ each represent an indolenine ring residue, a benzoindolenine ring residue or a dibenzoindolenine ring residue; L represents a linking group to form a mono- or dicarbocyanine dye; $X^-$ represents an anion; and m is an integer of 0 or 1.

[Chemical formula 15]

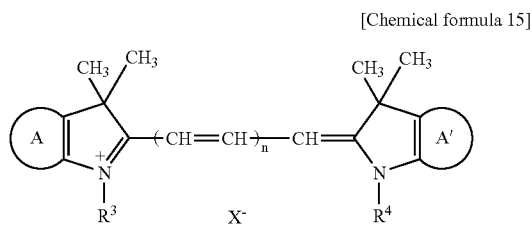

wherein A represents any one of the following formula 16 to formula 18:

[Chemical formula 16]

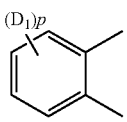

[Chemical formula 17]

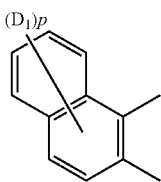

[Chemical formula 18]

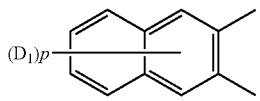

A' represents any one of the following formula 19 to formula 21:

[Chemical formula 19]

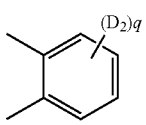

[Chemical formula 20]

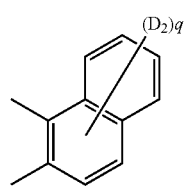

-continued

[Chemical formula 21]

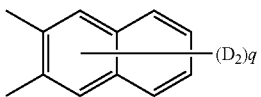

and A and A' may be identical or different (wherein $D_1$ and $D_2$ each represent a substituent selected from the group of a hydrogen atom, an alkyl group, an alkoxyl group, a hydroxyl group, a halogen atom, a carboxyl group, an alkoxycarbonyl group, an alkylcarboxyl group, an alkylhydroxyl group, an aralkyl group, an alkenyl group, an alkylamide group, an alkylamino group, an alkylsulfonamide group, an alkylcarbamoyl group, an alkylsulfamoyl group, an alkylsulfonyl group, a phenyl group, a cyano group, an ester group, a nitro group, an acyl group, an allyl group, an aryl group, an aryloxy group, an alkylthio group, an arylthio group, a phenylazo group, a pyridinoazo group, an alkylcarbonylamino group, a sulfonamide group, an amino group, an alkylsulfone group, a thiocyano group, a mercapto group, a chlorosulfone group, an alkylazomethine group, an alkylaminosulfone group, a vinyl group and a sulfone group, and may be identical or different; and p and q are each the number of the substituents, representing an integer of 1 or more); $R_3$ and $R_4$ each represent a substituent selected from the group of a substituted or unsubstituted alkyl group, a carboxyl group, an alkoxycarbonyl group, an alkylcarboxyl group, an alkoxyl group, an alkylhydroxyl group, an aralkyl group, an alkenyl group, an alkylamide group, an alkylamino group, an alkylsulfonamide group, an alkylcarbamoyl group, an alkylsulfamoyl group, a hydroxyl group, a halogen atom, an alkylalkoxyl group, a halogenated alkyl group, an alkylsulfonyl group, an alkylcarboxyl group or alkylsulfonyl group bonded with a metal ion or an alkyl group, a phenyl group, a benzyl group, an alkylphenyl group and a phenoxyalkyl group (the hydrogen atom on the benzene ring moiety and/or alkyl moiety may be substituted with a substituent other than a metal ion, such as an alkyl group, a carboxyl group, a hydroxyl group and a halogen atom, and this is also applicable to the corresponding moieties of the aforementioned phenyl group, benzyl group and alkylphenyl group), and may be identical or different; $X^-$ represents an anion selected from the group consisting of anions of a halide ion, $PF_6^-$, perchlorate, hydrofluoroborate, phosphate, benzenesulfonate, $SbF_6^-$, toluenesulfonate, alkylsulfonate, benzenecarboxylate, alkylcarboxylate, trifluoromethylcarboxylate, periodate, $SCN^-$, tetraphenylborate and tungstate; and n represents 0, 1 or 2.

With regard to the formula 15, mention may be made of the compounds in which A is arbitrarily selected from the structures of the formula 16 to formula 18, and A' is arbitrarily selected from the structures of the formula 19 to formula 21, the compounds having A and A' combined such that all possible combinations of the two can be selected. For example, mention may be made of the combinations of the formula 16 with each of the formula 19 to the formula 21, and this is applied in the same manner to the Formula 17 and the formula 18. In the substituents of A and A', that is, $(D_1)_p$ and $(D_2)_q$, p and q are each at least 1 or an integer of plurality, namely, an integer of 2 or more.

Specific examples of the cyanine compound may include the formula 8 and those mentioned in the below-described Examples.

The azo dye as the organic dye is a dye compound having an azo (—N=N—) group in the molecule. It may or may not be a metal-containing compound and may be identical to the photostabilizer of the metal-containing azo compound of the formula 2. In this case, if no photostabilizer other than this photostabilizer is used, only this identical dye is used.

In preparation of the optical information recording medium of the invention, a solution is prepared by dissolving an organic dye such as the aforementioned cyanine dye, a photostabilizer comprising the compound of the formula 1 and the like, and the solution is applied on a light-transmissive substrate. For this dye solution, fluorine-based solvents such as chloroform, dichloroethane and fluorinated alcohols, methyl ethyl ketone, dimethylformamide, methanol, toluene, cyclohexanone, acetylacetone, diacetone alcohol, cellosolves such as methylcellosolve, dioxane and the like may be used, and a plurality of these may be used together. In this case, the mixing ratio of the cyanine dye is preferably from 1% to 10% by weight.

Further, the substrate used in the invention is exemplified by glass, or plastics such as epoxy resins, methacrylic resins, polycarbonate resins, polyester resins, polyvinyl chloride resins and polyolefin resins. This substrate may have track grooves or pits formed thereon and may also have the signals required in address signaling.

Furthermore, upon application of the above-described cyanine dye solution onto the substrate, it is preferred to use spin coating.

The optical information recording medium may be provided with a reflective layer, in addition to the above-mentioned light interference layers, and may further have a protective layer on the reflective layer, and also a protective layer on the surface of the substrate (incident to laser light).

As the reflective layer, mention may be made of high reflectance materials such as metal films of Au, Al, Ag, Cu, Pt, alloys of each of these metals with others, alloys further containing trace amounts of components other than these, or the like, formed by vapor deposition or sputtering. The protective layer may be exemplified by a coating layer formed by applying a solution of a radiation-curable resin such as UV-curable resin via spin coating or the like, for the purpose of protecting the optical information recording medium and improving resistance to weather, and then curing with radiation.

As such, an optical disk having light interference layers including a dye layer, a reflective layer and also protective layers provided on the substrate can be obtained. Optical disks of the same constitution except that at least those light interference layers are present, or of different constitutions may be bonded together, or substrates themselves may be bonded against each other.

With regard to the material and method for such bonding, UV-curable resins, cationic curable resins, two-sided adhesive sheets, the methods of hot melting, spin coating, dispensing (extrusion), screen printing, roll coating or the like are used.

To a cyanine dye or an azo dye as an organic dye, when a photostabilizer having high effect of suppressing light-induced deterioration of the organic dye and exerting the effect sustainedly in order to make light-induced deterioration of itself difficult is added, when a photostabilizer which can suppress the effect of the thermal decomposition product of the organic dye on the facilitation of light-induced deterioration of the organic dye is added, and further when both of these photostabilizers are added for use, even though it is more preferable and more certain to add and use both of these photostabilizers, the light fastness (storage stability) can be significantly improved, and simultaneously an optical information recording medium which is capable of high speed recording at an 8 times speed as well as even higher speed can be provided.

EXAMPLES

Next, the invention is described by way of Examples. The specific numerals indicated below are examples and are not intended to limit the present invention; in other embodiments, the numerals may be 1/10 to 10 times, 1/5 to 5 times, 1/2 to 2 times, or 1/1.2 to 1.2 times the specific numerals indicated below.

Example 1

A transparent substrate made of polycarbonate having a thickness of 0.6 mm and an external diameter (diameter) of 120 mmφ, with spiral grooves of 0.3 µm in width and 160 nm in depth with a pitch of 0.74 µm formed on the surface thereof, was molded by injection molding.

Next, a coating solution S1 was prepared by dissolving 0.12 g of the compound of the following formula 22 (cyanine dye), 0.07 g of the compound of the formula 13 (metal-containing azo dye) (photostabilizer) and 0.01 g of the compound of the formula 9 (aminium-based photostabilizer) in 10 ml of 2,2,3,3-tetrafluoro-1-propanol.

This coating solution S1 was applied on the surface of the aforementioned substrate by spin coating (rotating speed of 2000 rpm) to form a light interference layer consisting of a recording layer with an average dye film thickness of about 50 nm.

[Chemical formula 22]

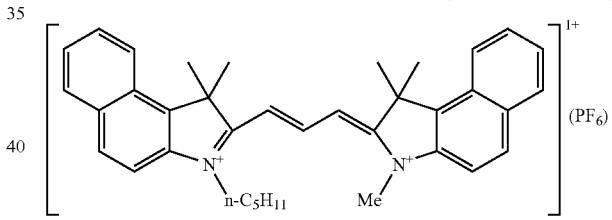

On this light interference layer, an Ag film having a thickness of 100 nm was formed by sputtering to form a reflective layer. Further, on this reflective layer, a UV-curable resin SD-318 (manufactured by Dainippon Ink and Chemicals, Inc.) was spin coated, and the resulting coating was cured by irradiation with a UV ray to form a protective layer consisting of a protective film having a thickness of 5 µm. On the surface of this protective layer, a UV-curable resin adhesive was applied, and a substrate made of the same material and the same shape as described above was bonded and adhered thereto by curing this adhesive with a UV ray. Thus, a recordable optical disk was obtained. It is also permissible to use the protective layer as an adhesive as well.

Thus prepared optical disk was subjected to 8× high speed (8 times speed) recording of EFM signal at a line speed of 28 m/sec using DDU-1000 (optical disk evaluation apparatus manufactured by Pulstech Industrial Co., Ltd.) equipped with a laser of 660 nm (NA (numerical aperture)=0.65), and the laser power was 26 mW (recording sensitivity, the same in the following). After the recording, the same apparatus was used to reproduce the signal at a laser output of 0.7 mW, and the reflectance, degree of modulation, error rate and jitter were measured. Further, the disk used in the recording evaluation was irradiated with a solar simulator (3 to 5 MLx·Hr (Megalux-time)), and the change in the error was observed to investigate light fastness of the optical disk.

In addition, the above-mentioned coating solution S1 was applied on a single plate of transparent substrate made of polycarbonate (polycarbonate single plate) by spin coating to form an organic dye film M1 which is the same as the recording layer used in an optical medium such as DVD-R. Also, the thermal decomposition product of the aforementioned cyanine dye (the formula 22) (the thermal decomposition product staying behind without volatilizing upon heating of the dye at 300° C. as described above) was mixed with coating solution SI in an amount of 30% by weight relative to the cyanine dye in the coating solution, and the mixture was applied on the polycarbonate single plate by spin coating in the same manner as described above to form an organic dye film M2. These organic dye film M1 and organic dye film M2 were irradiated with xenon light for a certain time, and the absorption spectra of before and after irradiation of the respective organic dye films were measured with a spectrophotometer, thereby examining the behavior of light-induced deterioration of each organic dye film to determine the time for the dye residual ratio to reach 50%. In addition, the experimental method was according to the above-described "Method of Experiment." The results are presented in Table 7. In the table, "DC Jitter (%)" denotes the "Date to Clock Jitter," which is the jitter value obtained after one rotation of an optical information recording medium and indicates the movement of the recording pits. When this DC Jitter exceeds 10%, in the case of DVD-R, the standardized error signal (PI error) becomes likely to exceed the standard value 280.

As shown in Table 7, the time for the dye residual rate to reach 50% after irradiation of the dye film formed using the aforementioned coating solution S1 was equal to 567 hr, and the time for the dye residual rate to reach 50% upon mixing of the thermal decomposition product was 555 hr. As such, deterioration of a dye film due to light is being suppressed by appropriately combining with a photostabilizer, and also the effect of light-induced deterioration upon mixing with the thermal decomposition product is hardly observed. Therefore, it was possible to design a medium which does not cause an increase of error even after irradiation of 5.0 MLx·Hr (Megalux-time) and which can secure good signaling.

TABLE 7

| | (1) | (2) | (3) | (4) | (5) | (6) | (7) | (8) |
|---|---|---|---|---|---|---|---|---|
| Ex. 1 | 6.9 | 0.2 | 0.9 | 1.2 | 1.4 | 567 | 555 | 1.02 |
| Ex. 2 | 7.2 | 0.3 | 0.5 | 0.9 | 1.9 | 891 | 869 | 1.03 |
| Ex. 3 | 7.3 | 1.2 | 1.8 | 2.4 | 10.8 | 433 | 416 | 1.04 |
| Ex. 4 | 7.5 | 3.2 | 3.8 | 4.4 | 13.4 | 481 | 444 | 1.08 |
| Comp. Ex. 1 | 6.5 | 0.6 | — (Measurement impossible) | — (Measurement impossible) | — (Measurement impossible) | 31 | 21 | 1.48 |
| Comp. Ex. 2 | 6.8 | 0.9 | 358 | — (Measurement impossible) | — (Measurement impossible) | 159 | 108 | 1.47 |
| Ex. 5 | 14.8 | 409 | 455 | 460 | 509 | 1035 | 998 | 1.04 |
| Ex. 6 | 7.4 | 1.4 | 148 | 389 | — (Measurement impossible) | 502 | 314 | 1.60 |

(1): DC jitter [%] after 8 × recording
(2): PI error [−] after 8 × recording
(3): PI error of medium after irradiation at 3.0 Mlx · Hr (the medium measured with respect to (2))
(4): PI error of medium after irradiation at 4.0 Mlx · Hr (the medium measured with respect to (2))
(5): PI error of medium after irradiation at 5.0 Mlx · Hr (the medium measured with respect to (2))
(6): Time for the dye residual ratio to reach 50% after irradiation of the dye film spin coated on a polycarbonate single plate [hr]
(7): Time for the dye residual ratio to reach 50% after irradiation of the dye film having thermal decomposition product mixed therein and tested under the same conditions as in (6) [hr]
(8): Extent of light-induced deterioration of the dye due to the thermal decomposition product <(6) ÷ (7)>

Example 2

A coating solution S3 was prepared in the same manner as in Example 1, except that a metal-containing azo dye (the following formula 23) was used instead of the cyanine dye (the formula 22), and the same method as in Example. 1 except using this coating solution S3 was used to examine the recording characteristics of the optical disk, light fastness and the behavior of light-induced deterioration of the dye film. The results are presented in Table 7.

As shown in Table 7, the time for the dye residual ratio to reach 50% after irradiation of the dye film employing the aforementioned coating solution S3 was as long as 891 hr, and even when thermal decomposition product was mixed in, the time for the dye residual ratio to reach 50% was 865 hr. As such, deterioration of a dye film due to light is being suppressed by appropriately combining with a photostabilizer, and also the effect of light-induced deterioration upon mixing with thermal decomposition product is hardly observed. Therefore, it was possible to design a medium which does not cause an increase of error even after irradiation at 5.0 MLx·Hr (Megalux-time) and which can secure good signaling.

[Chemical formula 23]

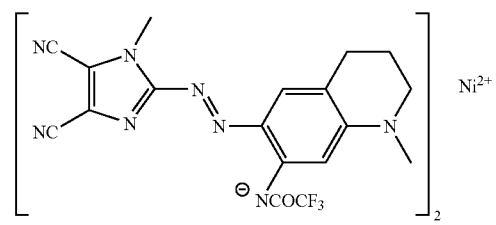

Example 3

A coating solution S4 was prepared in the same manner as in Example 1, except that the cyanine dye (the formula 22) was used in an amount of 0.18 g instead of 0.12 g, the metal-containing azo dye (the compound of the formula 23) was not used, and the amount of the aminium compound (the compound of the formula 9) was changed from 0.01 g to 0.02 g. The same method as in Example 1 except using this coating solution S4 was used to examine the recording characteristics of the optical disk, light fastness and the behavior of light-induced deterioration of the dye film. The results are presented in Table 7.

As shown in Table 7, the time for the dye residual ratio to reach 50% after irradiation of the dye film employing the aforementioned coating solution S4 was as long as 433 hr, and even when thermal decomposition product was mixed in, the time for the dye residual ratio to reach 50% was 416 hr. As such, deterioration of a dye film due to light is being suppressed by appropriately combining with a photostabilizer, and also the effect of light-induced deterioration upon mixing with thermal decomposition product is hardly observed. Therefore, it was possible to design a medium which does not cause an increase of error even after irradiation at 5.0 MLx·Hr (Megalux-time) and which can secure good signaling.

Example 4

A coating solution S5 was prepared in the same manner as in Example 1, except that the cyanine dye (the formula 22) was used in an amount of 0.10 g instead of 0.12 g, the metal-containing azo dye (the compound of the formula 13) was used in an amount of 0.10 g instead of 0.07 g, and the aminium compound (the compound of the formula 9) was not used. The same method as in Example 1 except using this coating solution S5 was used to examine the recording characteristics of the optical disk, light fastness and the behavior of light-induced deterioration of the dye film. The results are presented in Table 7.

As shown in Table 7, the time for the dye residual ratio to reach 50% after irradiation of the dye film employing the aforementioned coating solution S5 was as long as 481 hr, and even when thermal decomposition product was mixed in, the time for the dye residual ratio to reach 50% was 444 hr. As such, deterioration of a dye film due to light is being suppressed by appropriately combining with a photostabilizer, and also the effect of light-induced deterioration upon mixing with thermal decomposition product is hardly observed. Therefore, it was possible to design a medium which does not cause an increase of error even after irradiation at 5.0 MLx·Hr (Megalux-time) and which can secure good signaling.

Comparative Example 1

A coating solution S6 was prepared in the same manner as in Example 1, except that the cyanine dye (the formula 22) was used in an amount of 0.20 g instead of 0.12 g, and the metal-containing azo dye (the compound of the formula 23) and the aminium compound (the compound of the formula 9) were not used. The same method as in Example 1 except using this coating solution S6 was used to examine the recording characteristics of the optical disk, light fastness and the behavior of light-induced deterioration of the dye film. The results are presented in Table 7.

As shown in Table 7, since a photostabilizer was not used, the time for the dye residual ratio to reach 50% after irradiation of the dye film employing the aforementioned coating solution S6 was as short as 31 hr only, and even when thermal decomposition product was mixed in, the time for the dye residual ratio to reach 50% was 21 hr. As such, since a photostabilizer was not used, deterioration of the dye film due to light is not suppressed, and also the effect of light-induced deterioration upon mixing with thermal decomposition product is enhanced. Therefore, the disk became a medium causing an increase of error after irradiation and having poor light fastness.

Comparative Example 2

A coating solution S7 was prepared in the same manner as in Example 1, except that the cyanine dye (the formula 22) was used in an amount of 0.19 g instead of 0.12 g, the photostabilizer was changed from the aminium compound (the compound of the formula 9) to a diimonium compound (the compound of the formula 13), and the metal-containing azo dye (the compound of the formula 13) was not used. The same method as in Example 1 except using this coating solution S7 was used to examine the recording characteristics of the optical disk, light fastness and the behavior of light-induced deterioration of the dye film. The results are presented in Table 7.

As shown in Table 7, since the photostabilizer used was a diimonium compound of low effect, the time for the dye residual ratio to reach 50% after irradiation of the dye film employing the aforementioned coating solution S7 was only 159 hr, which was less than a half of the result in Example 1, and even when thermal decomposition product was mixed in, the time for the dye residual ratio to reach 50% was 108 hr, the effect of facilitation of light-induced deterioration by the thermal decomposition product being significant. As such, since the effect of the photostabilizer is weak, deterioration of the dye film due to light is not suppressed, and the effect of light-induced deterioration upon mixing with thermal decomposition product is enhanced. Therefore, the disk became a medium causing an increase of error after irradiation and having poor light fastness.

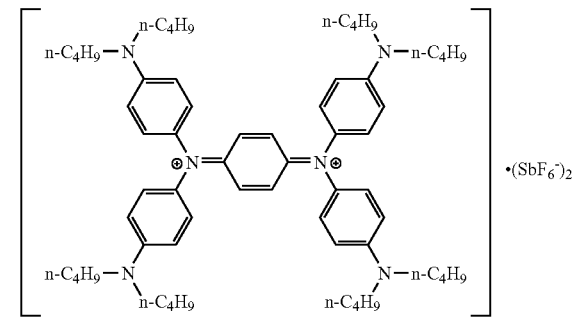

Example 5

A coating solution S8 was prepared in the same manner as in Example 1, except that the cyanine dye (the formula 22) was used in an amount of 0.05 g instead of 0.07 g, and the aminium compound (the compound of the formula 9) was used in an amount of 0.03 g instead of 0.01 g. The same method as in Example 1 except using this coating solution S8 was used to examine the recording characteristics of the optical disk, light fastness and the behavior of light-induced deterioration of the dye film. The results are presented in Table 7.

As shown in Table 7, since the amount of the photostabilizer added with respect to the cyanine dye was increased in order to secure higher storage stability, the time for the dye residual ratio to reach 50% after irradiation of the dye film employing the aforementioned coating solution S8 was 1035 hr, this time being almost double as compared with that of Example 1. Further, even when thermal decomposition product was mixed in, the time for the dye residual ratio to reach 50% was 998 hr, the effect of facilitation of light-induced deterioration by the thermal decomposition product being also suppressed. However, because the amount of the photostabilizer added is large, the values of DC jitter or PI error after 8 times speed recording are higher than the same values in Examples 1 to 4. As such, when the amount of a photostabilizer added is increased too much, deterioration of the dye film due to light is suppressed. However, since the dye film becomes far too strong (the reactivity becoming insufficient), the medium does not show an effect equivalent to the effects obtained in Examples 1 to 4 in high speed recording.

Example 6

A coating solution S9 was prepared in the same manner as in Example 1, except that the cyanine dye (the formula 22), the aminium compound (the compound of the formula 9) and the metal-containing azo dye (the formula 13) were not used, and only 0.20 g of a metal-containing azo dye (the formula 23) was used. The same method as in Example I except using this coating solution S9 was used to examine the recording characteristics of the optical disk, light fastness and the behavior of light-induced deterioration of the dye film. The results are presented in Table 7.

As shown in Table 7, although a photostabilizer is not used, since the metal-containing azo dye used is not very susceptible to light-induced deterioration, the time for the dye residual ratio to reach 50% after irradiation of the dye film employing the aforementioned coating solution S9 is 502 hr, which is close to the corresponding time obtained in Example 1. However, when thermal decomposition product is mixed in, the time for the dye residual ratio to reach 50% is 314 hr, and the effect of facilitation of light-induced deterioration by the thermal decomposition product is shown to be greater than the effects obtained in Examples 1 to 5. Because the effect of light-induced deterioration upon mixing with the thermal decomposition product has become relatively large, a medium in which the error upon irradiation is not reduced as much as in these Examples, and the light fastness does not improve as much as in these Examples, is obtained.

In the optical disks which are the same as those of Examples 1, 2, 3 and 5, except that the aforementioned Photostabilizer 2 (of the formula I 0) and Photostabilizer 4 (of the formula 12) were used instead of the photostabilizer used in these Examples (the formula 9), a light fastness equivalent to the light fastness shown in Tables 1 and 2 and FIGS. 1 and 2 can be obtained, and other performances equivalent to the corresponding performances of the Examples can be also obtained.

According to the invention, an optical information recording medium which can prevent deterioration due to photo/thermal interference upon long-term storage or heavily repeated reproduction, does not impair the performance of recording and reproduction and has so-called light resistance (light fastness) and good storage stability, which is capable of good high speed recording with respect to a laser light of a wavelength selected from the region of, for example, approximately 350 nm to 830 nm, and to which virtually all of the conventional preparation processes or any other suitable processes for CD-R, DVD-R or DVD+R can be applied without significant modifications, can be provided.

The present application claims priority to Japanese Patent Application No. 2004-187749, filed Jun. 25, 2004, the disclosure of which is incorporated herein by reference in its entirety.

It will be understood by those of skill in the art that numerous and various modifications can be made without departing from the spirit of the present invention. Therefore, it should be clearly understood that the forms of the present invention are illustrative only and are not intended to limit the scope of the present invention.

What is claimed is:

1. An optical information recording medium having light interference layers including a recording layer on a substrate, wherein the recording layer comprises an organic dye and a photostabilizer, said photostabilizer comprising a combination of the compound of formula 1 and the compound of formula 2:

[Chemical formula 1]

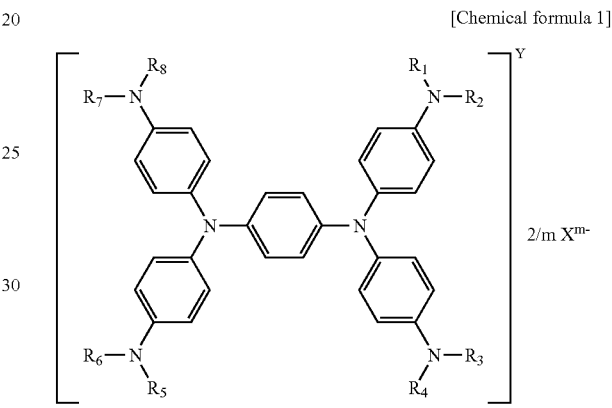

wherein $R_1$ to $R_8$ are such that at least one of these substituents represents a substituted alkyl group having a terminal cyano group; the other substituents among $R_1$ to $R_8$ each represent a different substituent including a linear or branched alkyl group or a hydrogen atom; Y represents 1+ (monovalent cation) or 2 + (divalent cation); $X^{m-}$ represents an anion; and m represents 1 or 2;

[Chemical formula 2]

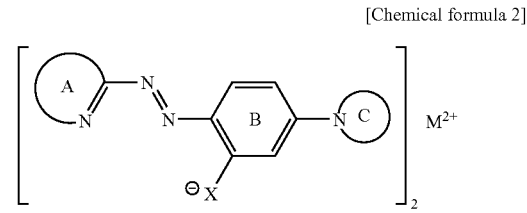

wherein ring A represents a heterocyclic ring formed with the carbon atom and the nitrogen atom to which the ring is bonded; ring B represents a benzene ring which may be substituted; ring C represents a heterocyclic ring including the nitrogen atom to which the ring is bonded, while this ring may be bonded to ring B; X' represents a group which can have active hydrogen; $M^{2+}$ represents a divalent metal cation; and the whole compound represents a metal complex in which two molecules of the entire anion as the azo dye molecule are bonded to 1 molecule of $M^{2+}$.

2. The optical information recording medium of claim 1, wherein the organic dye comprises a cyanine dye.

3. The optical information recording medium of claim 1, wherein the photostabilizer comprises an aminium compound of formula 6:

[Chemical formula 6]

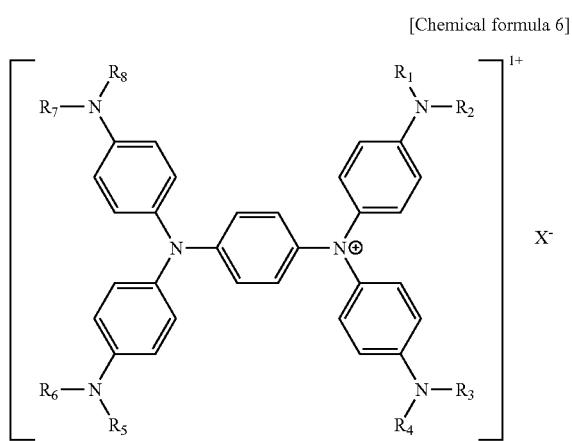

wherein $R_1$ to $R_8$ have the same meaning as defined for formula 1; and $X^-$ represents an anion selected from the group consisting of anions of a halide ion, $PF_6^-$, perchlorate, hydrofluoroborate, phosphate, benzenesulfonate, $SbF_6^-$, toluenesulfonate, alkylsulfonate, benzenecarboxylate, alkylcarboxylate, trifluoromethylcarboxylate, periodate, $SCN^-$, tetraphenylborate and tungstate.

4. The optical information recording medium of claim 1, wherein the photostabilizer comprises a diimonium compound of formula 7:

[Chemical formula 7]

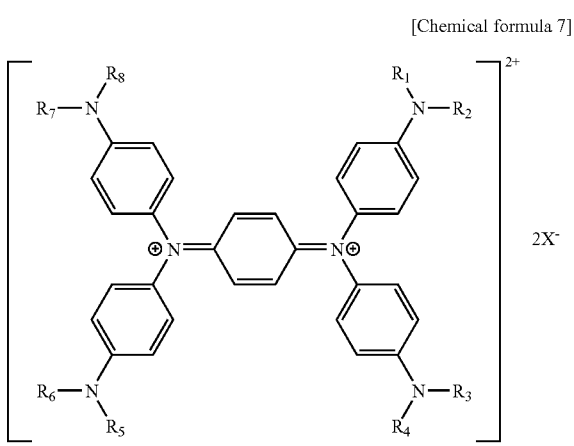

wherein $R_1$ to $R_8$ have the same meaning as defined for formula 1; and $X^-$ represents an anion selected from the group consisting of anions of a halide ion, $PF_6^-$, perchlorate, hydrofluoroborate, phosphate, benzenesulfonate, $SbF_6^-$, toluenesulfonate, alkylsulfonate, benzenecarboxylate, alkylcarboxylate, trifluoromethylcarboxylate, periodate, $SCN^-$, tetraphenylborate and tungstate.

5. The optical information recording medium according to claim 3, wherein with respect to formula 6, at least half of $R_1$ to $R_8$ represent a linear or branched, substituted lower alkyl group having a terminal cyano group.

6. The optical information recording medium according to claim 4, wherein with respect to formula 7, at least half of $R_1$ to $R_8$ represent a linear or branched, substituted lower alkyl group having a terminal cyano group.

7. The optical information recording medium according to claim 1, wherein the compound of formula 1 is contained in an amount of 20% by weight or less relative to the organic dye.

8. The optical information recording medium according to claim 1, which has at least 400-hour stability which is a time for a dye residual ratio to reach 50% after being irradiated with xenon light.

9. The optical information recording medium according to claim 1, which is CD-R, DVD-R, or DVD+R.

10. The optical information recoding medium according to claim 9, which is an 8-times speed recording medium.

11. The optical information recoding medium according to claim 1, wherein the recording layer is responsive to a laser light of a wavelength of 350 nm to 830 nm for recording and reproduction.

12. The optical information recoding medium according to claim 1, wherein the ratio in weight of the compound of formula 1 and the compound of formula 2 is from 1:3 to 1:8.

13. The optical information recoding medium according to claim 1, wherein the ratio in weight of the compound of formula 1 and the compound of formula 2 is from 1:4 to 1:7.

* * * * *

UNITED STATES PATENT AND TRADEMARK OFFICE
CERTIFICATE OF CORRECTION

PATENT NO.         : 7,501,171 B2
APPLICATION NO. : 11/159616
DATED              : March 10, 2009
INVENTOR(S)       : Uchida et al.

Page 1 of 1

It is certified that error appears in the above-identified patent and that said Letters Patent is hereby corrected as shown below:

At Column 5, Line 37, below "7:" please insert --[Chemical formula 6]--.

At Column 6, Line 1, please insert --[Chemical formula 7]--.

Signed and Sealed this

Twenty-ninth Day of December, 2009

David J. Kappos
*Director of the United States Patent and Trademark Office*